United States Patent [19]

Hasegawa

[11] 4,389,424

[45] Jun. 21, 1983

[54] PRODUCTION OF SEMIPROCESSED FRIED POTATO PIECES FOR PRESERVATION AT ROOM TEMPERATURE

[75] Inventor: Hiroshi Hasegawa, Tokyo, Japan

[73] Assignee: Dai Nippon Insatsu Kabushiki Kaisha, Tokyo, Japan

[21] Appl. No.: 264,239

[22] Filed: May 18, 1981

Related U.S. Application Data

[63] Continuation of Ser. No. 127,054, Mar. 4, 1980, abandoned.

[30] Foreign Application Priority Data

Jun. 4, 1979 [JP] Japan ................................ 54-68845

[51] Int. Cl.³ .................... A23B 7/14; A23L 1/216
[52] U.S. Cl. .................................. 426/546; 426/412; 426/415; 426/438; 426/637; 426/808
[58] Field of Search ............. 426/106, 324, 325, 541, 426/544, 546, 637, 410, 412, 415, 419, 438, 441, 808

[56] References Cited

U.S. PATENT DOCUMENTS

| | | | |
|---|---|---|---|
| 3,594,187 | 7/1971 | Liepa .................................. | 426/637 |
| 3,634,095 | 1/1972 | Willard .............................. | 426/441 |
| 3,634,105 | 1/1972 | Beck et al. ...................... | 426/637 X |
| 3,881,028 | 4/1975 | Capossela et al. ............. | 426/441 X |
| 3,975,551 | 8/1976 | Shatila ............................... | 426/637 |
| 4,097,612 | 6/1978 | Powrie et al. .................. | 426/325 X |
| 4,109,012 | 8/1978 | Bates et al. ...................... | 426/438 X |
| 4,135,003 | 1/1979 | Mohwinkel ..................... | 426/637 X |

FOREIGN PATENT DOCUMENTS 1299009  12/1972  United Kingdom ................ 426/637

OTHER PUBLICATIONS

Braverman, *Introduction to the Biochemistry of Foods,* 1963, p. 247.

*Primary Examiner*—Arthur L. Corbin
*Attorney, Agent, or Firm*—Parkhurst & Oliff

[57]     ABSTRACT

Potato pieces or strips prepared by washing, peeling, and cutting raw potatoes are immersed in an aqueous solution of an antioxidant and a texture enhancing agent, washed, drained, prefried for partial drying in deep edible oil thereby to reduce their water content by 10 to 20 percent by weight, packaged, gas-tightly sealed under vacuum in a bag made of a laminated sheet comprising a thermoplastic resin film and an aluminum foil, and then sterilized by heating under pressure. The preprocessed potato pieces thus produced can be preserved for a number of months while being stored and distributed at room temperature and require only a few minutes of final frying in deep oil or fat for consumption.

9 Claims, No Drawings

PRODUCTION OF SEMIPROCESSED FRIED POTATO PIECES FOR PRESERVATION AT ROOM TEMPERATURE

This is a Continuation Division of application Ser. No. 127,054 filed March 4, 1980, now abandoned.

FIELD OF THE INVENTION

This invention relates generally to food processing and packaging and more particularly to a process for producing semiprocessed fried potato in packaged state suitable for marketing (storing and distribution) at room temperature.

BACKGROUND OF THE INVENTION

Fried potatoes prepared by cutting potatoes into pieces of suitable size and frying these pieces in deep fat or oil, particularly so-called French-fried potatoes, are widely consumed as a snack food and as an accompanying food for meat, fowl, and fish courses and are greatly relished because of their unique aroma, flavor, and pleasant feel in the mouth.

This fried potato can be directly prepared from the raw potato through the process steps of washing in water, peeling, cutting, draining and frying in deep fat or oil (hereinafter referred to collectively as "oil") in any ordinary kitchen such as that in a home or in a restaurant. However, in order to simplify the cooking process, it is becoming a widespread practice to produce and market semiprocessed fried potatoes so that only a short, final deep-oil frying step need be carried out in the kitchen.

Heretofore, a typical process for producing this semiprocessed fried potato has comprised washing raw potatoes in water, peeling the same, cutting the same into pieces, immersing these pieces in an aqueous solution containing an antioxidant and a texture enhancing agent, draining off water from the pieces, pre-frying the pieces in deep oil, freezing the fried pieces, and packaging the same. In this process, the freezing is carried out for the purpose of preserving the quality of the semiprocessed product and for its preservation and stable supply throughout the year. The pre-frying in deep oil is carried out for improving the quality and efficiency of the product in use. The semiprocessed fried potato thus produced is distributed and marketed in the frozen state and preserved in freeze preservation facilities owned by the consumers until the final step of frying in deep oil.

The production and distribution of the semiprocessed products produced by the above described process, however, are accompanied by difficult problems. More specifically, the semiprocessed product produced in a frozen state requires freezing facilities respectively prior to, during, and after distribution, and the cost for procuring and maintaining these facilities is considerable. Furthermore, another problem is unintentional thawing of the once-frozen semiprocessed product caused by failures in facilities such as the freezing equipment and giving rise to a serious deterioration of the product quality.

In order to avoid these problems of distribution and preservation accompanying semiprocessed products in frozen state, the production of semiprocessed fried potato for preservation at room temperature is being considered in some quarters, but has not been reduced to practice in the present state of the art. One production process proposed for this purpose is that for so-called retort foods which, after the steps of washing in water, peeling, cutting, and treating in an aqueous solution containing a texture enhancing agent and an antioxidant of the potatoes, contemplates the steps of draining, packaging the potato pieces directly as they are into retort bags, tightly sealing the bags, and retort sterilizing the bag contents by applying pressure and heat thereto.

However, the storing and distributing at room temperature of semiprocessed fried potato produced merely by such a process are accompanied by several other problems. More specifically, when the semiprocessed potato which has been packaged in a sealed bag is sterilized by heating under pressure in the final stage, moisture is driven out from the ruptured tissues of the potato by heating, and this moisture collects in the bag because of its sealed construction. Consequently, this water soaks into the semiprocessed potato, which then becomes soggy and may even assume the state of a gruel, whereby the texture of the semiprocessed potato becomes poor. Furthermore, a large quantity of excess moisture adheres also to the surfaces of the potato pieces and causes an extremely violent spattering of oil in the final cooking step of frying in deep oil, whereby this cooking step is made difficult and unpleasant.

These problems can be avoided by sufficiently drying the potato pieces prior to packaging. However, the unique aroma and flavor of fried potato arise from the direct frying in deep oil of the raw potato, and the deliciousness of eating fried potato is enhanced also by the combination of the crisp outer surface and the resilient, mealy interior part thereof. All of these desirable characteristics of fried potato cannot be obtained by frying dried potato pieces in deep oil.

While the procedure of storage and distribution of semiprocessed fried potato in this manner can be theoretically conceived in principle, it has not been reduced to actual practice.

As a result of my research, however, I have found that the deterioration of the semiprocessed fried potato represented by the above mentioned oozing out or exudation of moisture from the potato pieces is not due solely to the heating for retort sterilization but progresses with elapse of time as a consequence of overlapping of the effects of other factors. A representative factor among these is the effect of oxygen and light on the semiprocessed fried potato pieces. I have found further that, while a large quantity of moisture has a substantial effect on the deterioration of the potato pieces as described above, this difficulty can be remarkably overcome, not only by completely removing the moisture from the potato pieces in their natural state, but also by partially lowering the moisture content.

More specifically, since the solid content and the water content within a raw potato piece exist in a state of equilibrium, this equilibrium is disrupted by a variation in an external influence such as the retort sterilization treatment, whereby oozing out of water occurs. Accordingly, by causing beforehand the water content in the potato to be somewhat lower than that for the equilibrium state, the oozing out of water due to a variation in an external influence can be prevented. I have found also that when potato pieces which are in a partially dried state, and not in a completely dried state, are fried in deep oil, the above mentioned desirable characteristics of fried potato are retained and preserved.

This desirable result may be attributed to ample heating even to the innermost part of each potato piece when the final step of frying in deep oil is carried out, whereby moisture saturation occurs with a relatively low absolute water content. In the case where raw potato pieces are fried directly in deep oil, the surplus water under the heating condition is driven out of the potato pieces.

As a result of my further study conducted on the basis of the above described findings, I have found further that when potato pieces are partially dried prior to packaging and, moreover, are then packaged with an enveloping packaging material which has a gas-impervious or gas-barrier property and lightproofness, deterioration of the semiprocessed fried potato pieces during storage and distribution at room temperature can be prevented, and, at the same time, the above mentioned desirable characteristics of fried potato can be substantially preserved until the potato pieces are finally fried and eaten.

SUMMARY OF THE INVENTION

It is an object of this invention to provide, on the basis of the above described findings, a process for producing semiprocessed fried potato slices, strips, shoe-string strips, short bars, and the like (herein referred to collectively as "pieces") in a packaged state suitable for storing and distribution at room temperature, during which the desirable unique characteristics of fried potato are preserved to be fully exhibited when the potato pieces are finally fried and consumed.

According to this invention in one aspect thereof, briefly summarized, there is provided a process for producing semiprocessed potato for preservation at room temperature which comprises: partially predrying potato pieces which have been prepared by washing, peeling, and cutting raw potatoes; placing the pieces thus predried into a packaging bag made of a sheet material having a gas-barrier property and lightproofness; gas-tightly sealing the bag to package the pieces; and sterilizing by heating the potato pieces thus packaged.

According to another aspect of this invention, there are provided semiprocessed potato pieces processed and packaged for preservation at room temperature during storage and marketing to be ultimately finish-fried in deep oil and consumed, which potato pieces are produced by the above summarized process.

The nature, utility, and further features of this invention will be more clearly apparent from the following detailed description.

DETAILED DESCRIPTION OF THE INVENTION

In accordance with this invention, raw potatoes are first washed with water, peeled, and cut into pieces of suitable size. These steps are carried out according to the ordinary method in the prior art and are not especially novel. If desired, the potato pieces thus prepared are treated by immersion thereof in an aqueous solution containing a texture enhancing agent and an antioxidant. Examples of suitable texture enhancing agents are calcium chloride, potassium alum, and calcium phosphate. The concentration of the texture enhancing agent is 0.5 to 1.5 percent, preferably 0.5 to 1.0 percent (throughout this disclosure, quantities expressed in percent being by weight). The antioxidant, an example of which is ascorbic acid, is used in a concentration of 0.5 to 2.0 percent.

After the above described immersion treatment, the potato pieces are subjected to blanching for 5 to 10 minutes with a medium such as steam, according to necessity, to deactivate the enzyme activity of the potato and are then drained.

The potato pieces thus obtained are partially predried according to this invention. This predrying is carried out until the moisture content is reduced by 10.0 to 20 percent, preferably 15.0 to 17.0 percent. This degree of drying is especially critical. If this degree of drying is less than 10 percent, the oozing out of water in the subsequent sterilization treatment or during storage cannot be sufficiently prevented. On the other hand, if 20 percent is exceeded, the aroma and flavor of the fried potato product will be impaired. Furthermore, the weight of the potato will be excessively reduced, whereby the loss will be great. Since a potato ordinarily has a water content of from 78.0 to 82.0 percent, the water content in the potato pieces after predrying becomes from 61.0 to 72.0 percent, preferably from 63.0 to 67.0 percent.

The predrying can be carried out by a variety of methods, including frying in oil, exposure to a stream of hot air, or heating by means of an infrared heater or a far-infrared heater. However, frying in oil is an effective and conveniently simple method. More specifically, one desirable feature of this predrying method is that it is substantially the same as the final cooking step of frying in oil, whereby a process step of a different nature is not introduced into the entire process of producing fried potato pieces.

Another desirable feature of this predrying method is that it fulfills the following condition. Since the aforementioned oozing out of water from the potato pieces occurs from the outer surfaces thereof, it is desirable that the predrying operation be of a mode by which the moisture is removed with priority from the surfaces of the potato pieces, and the desired water content is retained in the interior of the pieces. Frying in oil is one of the methods which most ideally satisfy this condition. Still another desirable feature of this predrying method is that a thin shell into which the oil has permeated is formed around the outer surface of each potato piece by the frying in oil. This shell functions to effectively prevent oozing out of moisture from the interior of the piece.

While this frying in oil can be carried out with any edible oil, light oils such as shortening oils and salad oils are preferable. I have found that the best results are obtained by frying the potato pieces at a relatively high temperature such as, for example, 140° to 190° C., preferably 170° to 190° C., for a short time such as 15 to 60 seconds. These conditions are selected for the purpose of removing water with priority from the surfaces of the potato pieces. After this frying in oil, surplus oil is drained off.

A specific quantity of the potato pieces thus predried is then charged into a bag, a pouch, a sealable tray or cup or the like (herein referred to collectively as "a bag") made of a packaging material having a gas-barrier property and lightproofness, and the bag is then sealed in a gastight manner. A most desirable packaging material for this purpose which simultaneously possesses the above mentioned properties comprises a laminated sheet of a thermoplastic resin film and aluminum foil for retort use.

This packaging and sealing is preferably carried out by a vacuum packaging process, i.e., by sealing the predried potato pieces in the packaging bag under vacuum. One reason for this is that vacuum packaging removes oxygen from the package bag interior. Another reason for this is that vacuum packaging greatly reduces the deformability of the package. More specifically, one cause of promoting deterioration of the potato pieces during storage at room temperature is physical damage of the potato pieces. This damaging of the potato pieces in many instances arises from stacking of the packaged semiprocessed product during storage or from the application of external forces locally to certain parts of the packaged potato pieces during handling in the market distribution. When vacuum packaging is resorted to, however, the structurally integral or unitary nature of the package bag and the potato pieces contained therein is improved, whereby the combined structure is not readily subject to external forces acting locally thereon, and the resistance to deformation of the entire semiprocessed fried potato product is increased.

Finally, the potato pieces sealed in the packaging bag are subjected to sterilization treatment until they can withstand storage at room temperature. The simplest sterilization treatment is heat treatment.

While the sterilization conditions cannot be generally stated since they differ with factors such as the shape of the package and the size (thickness) of the potato pieces, the sterilization temperature may be effected at a temperature of, e.g., 115° to 120° C. The sterilization time is appropriately determined with the sterilization value (Fo value) as a criterion so as to impart the desired preservability to the semiprocessed fried potato product.

While this sterilization can be carried out by any suitable heating method such as heating with hot air, a treatment wherein pressure and heat are applied by means of a retort sterilizer using steam or hot water is particularly suitable.

A semiprocessed fried potato product produced in the above described manner has a preservability of the order of six months at room temperature. After storage and distribution at room temperature, the package is opened when necessary within this period, and the contents are fried in deep edible oil, for example, at a temperature of 170° to 180° C. for a time of the order of 2.0 to 5.0 minutes, whereupon the final fried potato product is obtained for consumption.

In order to indicate more fully the nature and utility of this invention, the following specific examples of practice constituting preferred embodiments of the invention are set forth, it being understood that these examples are presented as illustrative only and are not intended to limit the scope of the invention.

EXAMPLE 1

Raw potatoes ("Danshaku" Species, produce of Hokkaidō, Japan) were washed, peeled, and cut into pieces measuring 10×10×30 mm. These pieces were treated by immersion for 60 minutes in an aqueous solution containing 1.0 percent of calcium chloride and 1.0 percent of L-ascorbic acid.

Thereafter, the pieces were washed with water, drained, and fried for 30 seconds in deep salad oil heated to 180° C. thereby to reduce the water content of the potato by 17 percent from that of the raw potato.

The potato pieces thus predried were cooled, and then 1 kg. of these pieces were placed in a retort bag measuring 320×250 mm. and made of a laminated sheet material comprising a 12-micron polyester film, a 9-micron Al foil, and a 60-micron polypropylene film. 100-percent vacuum sealing of the bag containing the potato pieces was then carried out by means of a vacuum packaging machine.

Sterilization of the potato pieces thus packaged and sealed was carried out at 120° C. for 20 minutes in a pressurized hot-water rotary type retort sterilizer. The packaged potato pieces were then promptly cooled.

After preservation for one month at 25° C., the package of the product manufactured in the above described manner was opened, and the semiprocessed fried potato pieces were fried for approximately 5 minutes in deep salad oil heated to 180° C., during which there was little spattering of the oil due to surplus water content. As a result, French-fried potatoes of firm texture and good taste and flavor were obtained.

Separately, the same procedure was followed except for the use of a retort bag of a laminated sheet comprising a 12-micron polyester film, a 9-micron Al foil, and a 60-micron high-density polyethylene film, whereupon results similar to those set forth above were obtained.

EXAMPLE 2

Raw potatoes ("Yukijiro" species, produce of Hokkaidō, Japan) were washed, peeled, and cut into pieces measuring 10×10×30 mm. by means of a potato cutter. These pieces were washed well in water, thereby to wash off excess starch and other substances, and were then treated by immersion for 60 minutes in an aqueous solution containing 1.5 percent of calcium chloride and 1.0 percent of L-ascorbic acid.

Thereafter, the potato pieces were washed in water and were then drained and fried for 60 seconds in deep lard oil heated to 140° C. By this predrying, the water content in the potato was lowered by 12 percent relative to that of the raw potato. Then the pieces were cooled by using dry aseptic air.

One kg. of the potato pieces thus cooled were placed in a retort bag measuring 320×250 mm. and made of a laminated sheet material comprising a 12-micron polyester film, a 9-micron Al foil, and a 60-micron polypropylene film. 100-percent vacuum sealing of the packaged potato pieces was then carried out by means of a vacuum packaging machine.

Sterilization of the potato pieces thus packaged and sealed was carried out at 130° C. for 7.5 minutes in a pressurized hot-water rotary type retort sterilizer, after which the potato pieces were immediately cooled.

After preservation for three months at 20° C., the package of the product manufactured in the above described manner was opened, and the semiprocessed fried potato pieces were fried for approximately 2 minutes in salad oil heated to 180° C., during which there was little spattering of the oil since there was almost no water adhering to the surfaces of the potato pieces. The finally fried potatoes thus obtained were crispy and had good taste and flavor.

What I claim is:

1. A process for producing semiprocessed fried potatoes for preservation at room temperature which comprises: pre-frying raw potato pieces, having a shape-retaining rigidity, in deep edible oil to partially dry the same so that the water content of the potato pieces is reduced by about 10 to 20 percent by weight to a water content of 61 to 72 percent by weight, said potato pieces having been prepared by washing, peeling and cutting raw potatoes; placing the pieces thus pre-fried into a packaging bag made of a sheet material having a gas-barrier property and lightproofness; gas-tightly sealing the bag thereby to package the pieces; and sterilizing by heating the potato pieces thus packaged.

2. A process according to claim 1 wherein the pre-frying step is performed at an oil temperature of 140° to 190° C. for a period of 15 to 60 seconds.

3. A process according to claim 1 in which the packaging bag material is a laminated sheet comprising a thermoplastic synthetic resin film and an aluminum foil.

4. A process according to claim 1 in which the potato pieces, prior to the pre-frying step, are immersed in an aqueous solution containing 0.5 to 2.0 percent by weight of an antioxidant and 0.5 to 1.5 percent by weight of a texture enhancing agent, washed with water, and drained.

5. A process according to claim 1 in which the sterilizing step is carried out by heating under pressure the potato pieces thus packaged.

6. A process according to claim 1 in which the step of packaging the pieces by gas-tightly sealing the bag is carried out by a vacuum-packaging procedure thereby to remove air from the interior of the bag.

7. A process for producing semiprocessed fried potatoes for preservation at room temperature which comprises: pre-frying raw potato pieces, having a shape-retaining rigidity, in deep edible oil to partially dry the same so that the water content of the potato pieces is reduced by about 10 to 20 percent by weight to a water content of 61 to 72 percent by weight, said potato pieces having been prepared by washing, peeling and cutting raw potatoes; placing the pieces thus pre-fried into a packaging bag made of a laminated sheet comprising a thermoplastic resin film and an aluminium foil; gas-tightly sealing the bag under vacuum thereby to package the pieces; and sterilizing by heating under pressure the potato pieces thus packaged.

8. A process according to claim 7 in which the potato pieces, prior to the pre-frying step, are immersed in an aqueous solution containing 0.5 to 2.0 percent by weight of an antioxidant and 0.5 to 1.5 percent by weight of a texture enhancing agent, washed with water, and drained.

9. A process as claimed in claim 1 or 7 wherein the pre-frying reduces the water content of the potato pieces by 15 to 17 percent by weight.

* * * * *